(12) United States Patent
Szyperski et al.

(10) Patent No.: US 9,201,874 B2
(45) Date of Patent: Dec. 1, 2015

(54) EFFICIENTLY CORRELATING NOMINALLY INCOMPATIBLE TYPES

(75) Inventors: Clemens A. Szyperski, Redmond, WA (US); Quetzalcoatl Bradley, Monroe, WA (US); Joshua R. Williams, Seattle, WA (US); Christopher L. Anderson, Redmond, WA (US); Donald F. Box, Bellevue, WA (US); Jeffrey S. Pinkston, North Bend, WA (US); Martin J. Gudgin, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1211 days.

(21) Appl. No.: 12/036,471

(22) Filed: Feb. 25, 2008

(65) Prior Publication Data
US 2009/0216791 A1  Aug. 27, 2009

(51) Int. Cl.
*G06F 17/30* (2006.01)

(52) U.S. Cl.
CPC .................................. *G06F 17/30* (2013.01)

(58) Field of Classification Search
CPC ....................................................... G06F 17/30
USPC ......................................................... 717/137
See application file for complete search history.

(56) References Cited

U.S. PATENT DOCUMENTS

| | | | |
|---|---|---|---|
| 5,642,514 A * | 6/1997 | Peckham ....................... | 717/144 |
| 6,085,030 A | 7/2000 | Whitehead et al. | |
| 6,134,559 A * | 10/2000 | Brumme et al. ..................... | 1/1 |
| 6,542,908 B1 | 4/2003 | Ims | |
| 6,549,955 B2 | 4/2003 | Guthrie et al. | |
| 6,915,324 B1 * | 7/2005 | Allavarpu et al. ............ | 709/200 |

(Continued)

FOREIGN PATENT DOCUMENTS

| | | |
|---|---|---|
| JP | 07-134693 | 5/1995 |
| JP | 2001-209562 | 8/2001 |
| JP | 2005-285073 | 10/2005 |

OTHER PUBLICATIONS

"Type-Safe Prototype-Based Component Evolution," by Matthias Zenger, B. Magnusson (Ed.): ECOOP 2002, LNCS 2374, pp. 470-497, Copyright Springer-Verlag Berlin Heidelberg 2002 [online] [retrieved on Dec. 20, 2007]. Retrieved from the Internet: http://www.cs.cornel/edu/andru/cs711/2002fa/reading/zenger02typesafe.pdf.

(Continued)

*Primary Examiner* — Li B Zhen
*Assistant Examiner* — Viva Miller
(74) *Attorney, Agent, or Firm* — Brian Haslam; Doug Barker; Micky Minhas

(57) ABSTRACT

A nominal type framework can be configured to efficiently correlate different nominal types together based on a minimum set of common type shapes or structures. In one implementation, a developer identifies a number of different nominal types of interest (source types), and identifies the minimum set of common type shapes to be accessed by an application program. The minimum set of common type shapes can then be used to create an intermediate type (target type) to which each of the other different source types can be mapped. For example, one or more proxies can be created that map shapes of the one or more source types to corresponding shapes of the created target type. The application program created by the developer, in turn, can access, operate on, or otherwise use the mapped data of each different source type through a single target type.

26 Claims, 4 Drawing Sheets

(56) References Cited

U.S. PATENT DOCUMENTS

| | | | |
|---|---|---|---|
| 6,961,932 | B2 | 11/2005 | Mishra et al. |
| 6,986,143 | B2 | 1/2006 | Cole |
| 7,000,238 | B2 | 2/2006 | Nadler et al. |
| 7,188,158 | B1 | 3/2007 | Stanton et al. |
| 7,213,236 | B2 | 5/2007 | Gibbons |
| 7,526,752 | B1 * | 4/2009 | Darcy .......................... 717/107 |
| 7,640,555 | B1 * | 12/2009 | Prabhu et al. ................ 719/332 |
| 2002/0143641 | A1 | 10/2002 | Thomas et al. |
| 2004/0158567 | A1 * | 8/2004 | Dettinger et al. ............. 707/100 |
| 2004/0194058 | A1 | 9/2004 | Meijer |
| 2004/0249854 | A1 * | 12/2004 | Barnes-Leon et al. ..... 707/103 Y |
| 2005/0080755 | A1 * | 4/2005 | Aoyama .......................... 707/1 |
| 2005/0149552 | A1 | 7/2005 | Chan et al. |
| 2007/0027862 | A1 | 2/2007 | Meijer |
| 2007/0055655 | A1 * | 3/2007 | Bernstein et al. ................ 707/3 |
| 2007/0236369 | A1 * | 10/2007 | Fahmy et al. .................... 341/51 |
| 2009/0077114 | A1 * | 3/2009 | Zachariah ..................... 707/102 |

OTHER PUBLICATIONS

"Aspect-Specification Based on Structural Type Information," by Stefan Hanenberg, Mohammed Al-Mansari and Rainer Unland, Universary of Duisburg-Essen, Institute for Computer Science and Business Information Systems, Copyright 2006, ACM 1-59593-108-2/060004, pp. 1575-1579 [online] [retrieved on Dec. 20, 2007]. Retrieved from the Internet: http://portal.acm.org/citation.cfm?id=1141644.

"SWT, XML Put True Cross-Platform GUIs Within Reach," by A. Russell Jones, Jupitermedia Corporation, Copyright 2005, 3 pgs. [online] [retrieved on Dec. 20, 2007]. Retrieved from the Internet: http://www.devx.com/xml/Article/9782/1954.

A. Halevy, et al., "Data Integration: the Teenage Years", Sep. 2006, pp. 9-16. Retrieved from the internet on Sep. 27, 2012: http://www.cs.virginia.edu/~son/cs851/papers/dataintegration.vldb06.pdf.

Kalfoglou, et al., "Ontology Mapping: The I-15 State of the Art", Knowledge Engineering Review, Cambridge University Press, GB, vol. 18, No. 1, Mar. 1, 2003, pp. 1-31, ISSN: 0269-8889.

A. Boran, et al., "A Case Study of an Ontology-Driven Dynamic Data Integration in a Telecommunications Supply Chain", Nov. 2007, Retrieved from the Internet on Sep. 27, 2012: http://ftp.infomatik.rwth-aachen.de/Publications/CEUR-WS/Vol-293/paper1.pdf.

T. Critchlow, et al., "Automatic Generation of Warehouse Mediators Using an Ontology Engine", Apr. 1998. Retrieved from the Internet Sep. 27, 2012: https://e-reports-ext.llnl.gov/pdf/233851.pdf.

Shawn Bowers, et al., "An Ontology-Driven Framework for Data Transformation in Scientific Workflows", Feb. 27, 2004, data Integration in the Life Sciences, Springer-Verlag, Berlin/Heidelberg, pp. 1-16, ISBN: 978-3-540-21300-0.

* cited by examiner

EFFICIENTLY CORRELATING NOMINALLY INCOMPATIBLE TYPES

CROSS-REFERENCE TO RELATED APPLICATIONS

N/A

BACKGROUND

1. Background and Relevant Art

As computerized systems have increased in popularity, so have the various application programs and documents used on the computerized systems. In particular, there are now a wide range of applications programs configured for any number of purposes, whether to function as complex operating systems, databases, and so forth, or to function as more simple application programs configured for a narrow purpose. In many cases, software developers will write new application programs with a particular operating system/framework in mind, using any number of appropriate programming languages. Once the software is complete, the developer will compile the application into code, which can then be installed on a computer system with the appropriate operating system. In many cases, operating the new application program will involve interoperation with several other components or applications in the system/framework.

One will appreciate, therefore, that there are a number of considerations that often must be taken into account by developers of operating systems or generalized frameworks as well as developers of the individual application programs operating within the framework. Many of these interests may even be competing. For example, many application program developers may have interests related to fast and customizable operation, while many operating system/framework developers may have interests related to security and stability. In some cases, the security and stability requirements can restrict the speed and customizability of the way some application programs operate.

One area in which this tension can be apparent is with certain kinds of "type frameworks." In a type framework, functions, arguments, and even data values may be correlated with a specific "type," which generally defines how various data (i.e., functions, arguments, or values) need to appear before another application or component can access/process the corresponding data. In a system employing a strong type framework, the framework may be configured so that applications or components using one type framework are prohibited from executing or accessing functions and data corresponding to other type frameworks. Some example frameworks include nominal (or nominative) and structural type frameworks, although there are may different kinds of type frameworks.

In general, nominal (or nominative) type frameworks are configured so that data in one nominal type can only access (or be accessed by) other data that use the exact same type names (are of the same nominal type), or otherwise access (be accessed by) type names it knows about at creation/compilation, and vice versa. Thus, one application that uses a type name called "customer record" might be prohibited from accessing similar data managed by another application program under a type name called "member record," even though the type structure might be identical, if both types are unaware of each other. For example, structural identity might occur where both of the nominal types of customer record and member record include an equal number and kind of fields (e.g., a set including: first name="string," and second name="string," etc.) In contrast, structural type frameworks rely on matches between data structures or shapes, rather than names. While structural types are not limited to inexact type names, structural mismatches can occur when one of the types includes more or different kinds of structures/shapes than another type (e.g., member record includes first name="string," second name="string," and phone number=value).

Often, there are various workarounds to mismatches between various different types, including nominal and structural types so that applications can interoperate. Within a nominal type framework, for example, a developer can write new code for each application of interest that maps or converts type structures in one nominal type to identical type structures in another nominal type. Although a similar workaround between mismatched type structures is also possible, such conversion of structural types tends to be more complex. For example, the Lisp programming language implements one common, conventional structural type framework, where the basic structure is the data pair. To use data of another application program, therefore, a Lisp-based application will typically need to convert data structures in the other application into a data pair structure, which can be difficult.

Similarly, it can be difficult to convert from a Lisp data pair structure to another type structure in another application. This is true not only for differences in how data are arranged in Lisp, but also since the values of the Lisp data pair are often difficult to ascertain without a computationally expensive, complete traversal of the data pairs. This is partly because Lisp data pairs tend not to provide very much information via a basic query other than that the data pair are a "sequence." The Lisp programming framework, however, is not the only language that can present problems with different type structures. Other common languages that each use their own different type frameworks include XML, SQL, .NET, and JAVA, and interoperation often means some type conversion.

Accordingly, one way of ensuring interoperability between application programs is for application developers working on a similar platform to agree in advance to the details of nominal and/or types, as applicable. Of course, such rigid and precise agreement is not always possible, and provides little flexibility for other developers who may create components that will be used in the same system at a later time. Thus, developers often end up trying (as previously described) to write one or more interfaces that convert or otherwise map data in newer application types to data in another application type. For example, a developer writing an application written in one type framework may need to write one adaptor for other applications written in the Lisp programming language, and/or potentially also a separate adaptor for applications written in each of the XML, SQL, .NET, and JAVA programming languages.

One will appreciate that this means that the developer of the new application program will need to know (or learn) about the types used in the other programs. With fewer applications to consider, this problem may be more of a minor inconvenience. More commonly, however, this kind of scenario becomes exponentially problematic for many developers, particularly as the number of application programs that use similar or identical kinds of data (e.g., membership records, functions, etc.) on a system can grow. This problem can be further exacerbated since each of the various application programs can change or go through various upgrades, which may result in still further changes in type names and/or structures.

Yet another way others have tried to solves these types of problem is with "loose" or dynamic typing. With loose or dynamic typing, a newer application program need not necessarily have a precise understanding of type names or structures in preexisting application programs. Rather, the application components can determine at runtime if there is complete match between type structures/shapes, then map those type shapes during runtime. Unfortunately, dynamic or loose typing does not solve the problem of what to do when items of interest are structurally similar but not identical. Furthermore, and perhaps more importantly, dynamic or loose typing tends to result in significant performance and security losses, due to the runtime examinations by the applications that tend not to be evident with strong, or nominal typing systems.

Accordingly, there are a number of difficulties associated with accessing and using functions or data in type frameworks that can be addressed.

BRIEF SUMMARY

Implementations of the present invention provide systems, methods, and computer program products configured to efficiently correlate data between multiple different types in a nominal type framework without necessarily requiring a developer to create new and different corresponding plugins or adaptors for each different application. In particular, implementations of the present invention allow a developer to use a single intermediate type based on a set of common type shapes among one or more application programs of interest. Implementations of the present invention further include one or more proxies that can be used by and otherwise interface with the various application programs of interest, and map type shapes/structures in the different types to the common type shapes/structures defined in the intermediate type.

For example, a method in accordance with an implementation of the present invention can involve identifying one or more desired type shapes of a target type used by an application program. The method can also involve identifying one or more different application programs having corresponding one or more nominally incompatible source types that include the one or more desired type shapes of the target type. In addition, the method can involve receiving one or more instructions to execute the application program using the target type. Furthermore, the method can involve, after executing the application program, processing one or more access requests by the application program for data associated with the desired type shapes in the nominally incompatible types using one or more automatically generated proxies.

In addition, another or alternative method in accordance with an implementation of the present invention can involve identifying one or more desired type shapes of a type used by an application program installed in the system. The method can also involve identifying the one or more desired types shapes in one or more nominally incompatible types used by one or more different application programs. In addition, the method can involve automatically generating an intermediate type comprising a representation of the type used by the application program. Furthermore, the method can involve automatically generating one or more proxies that correlate the one or more desired type shapes of the one or more nominally incompatible types to the generated intermediate type.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to efficiently correlate data between multiple different types in a nominal type framework without necessarily requiring a developer to create new and different corresponding plugins or adaptors for each different application. In particular, implementations of the present invention allow a developer to use a single intermediate type based on a set of common type shapes among one or more application programs of interest. Implementations of the present invention further include one or more proxies that can be used by and otherwise interface with the various application programs of interest, and map type shapes/structures in the different types to the common type shapes/structures defined in the intermediate type.

Accordingly, and as will be understood more fully herein, implementations of the present invention provide one or more mechanisms for effectively transforming a source type instance conforming to one interface to a destination type instance conforming to another interface, and to be consumed by software that only has knowledge of the type interface. In general, no knowledge of the initial interface is required either by the software consuming interface or by the software invoking the conversion of the first interface to the second interface. As will be appreciated more fully herein, the different interfaces can be from different type systems, such as CLR (common language runtime) types, structured values, or XML (extensible markup language) schemas, among others. As such, implementations of the present invention enable software to interoperate with components providing data in an unfamiliar format, and to make use of frameworks that require data conforming to a schema that the software was not originally designed to produce.

Figure 1A:
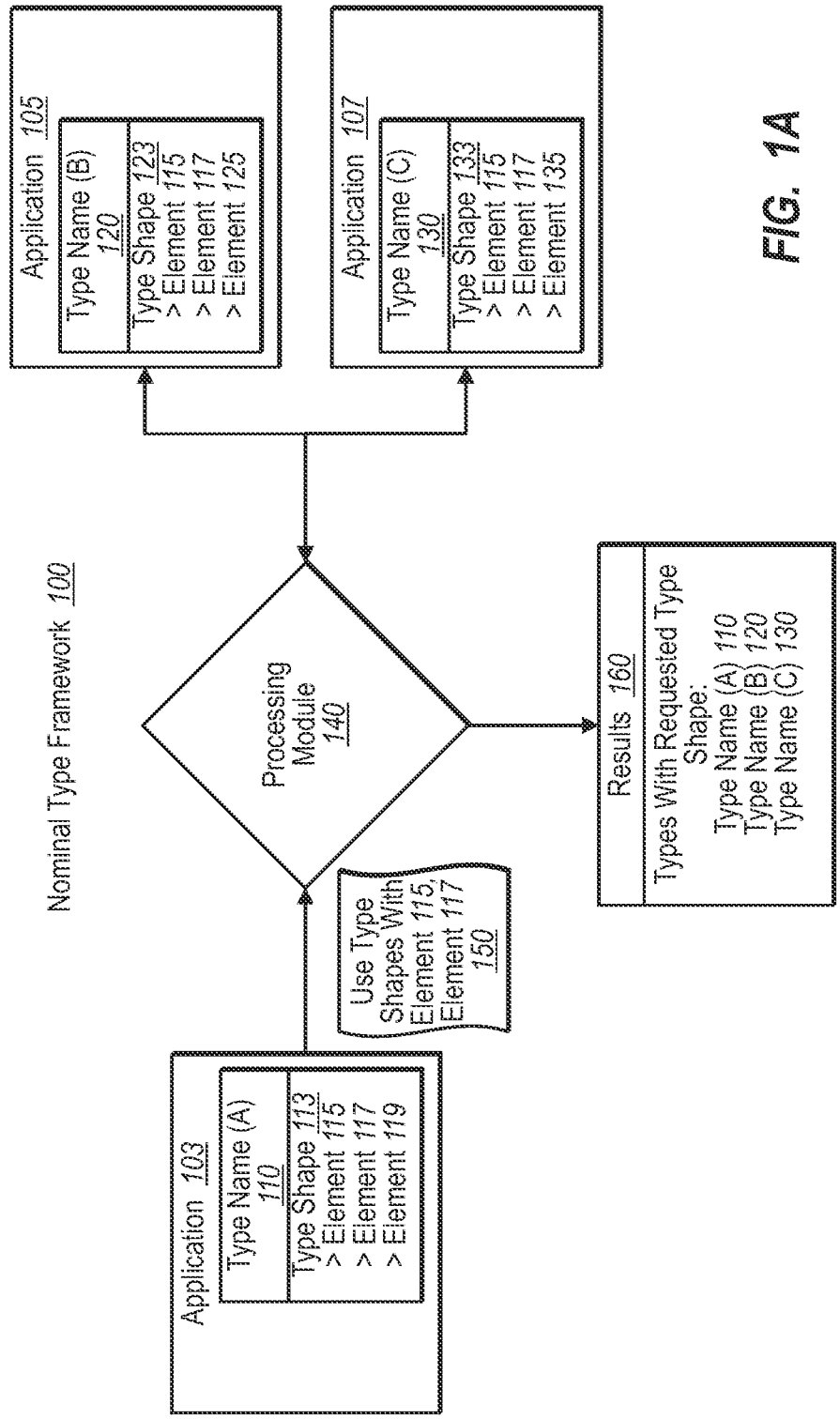
FIG. 1A illustrates an overview schematic diagram of a nominal type framework in accordance with an implementation of the present invention.

FIG. 1A illustrates an overview schematic diagram of a nominal type framework 100 that can be used in accordance with one or more implementations of the present invention. As shown, FIG. 1A illustrates a nominal type framework 100 in which several different applications 103, 105, and 107 are installed. Each application, in turn, uses a nominal type that is nominally incompatible with a nominal type of another application. For example, FIG. 1A shows that application 103 is using (or is otherwise configured according to) nominal type "A" 110. As shown, type name A 110 comprises one or more type shapes 113 having elements 115, 117 and 119.

By way of explanation, nominal type A could represent any number or kinds of data, including functions, arguments or even strings associated with a record. For example, nominal type A could define a customer record, and/or or one or more functions for handling customer data in a database program. In the case of a customer record, element 115 of type shape 113 might comprise a field representing a string based on a first name, while element 117 might comprise a field representing a string based on a last name. Element 119, in turn, might comprise another field representing a string based on an address field, or potentially a function to be evaluated (e.g., an age value calculated from a birthday string). Thus, in the case of a record, each of elements 115, 117 and 119 might comprise some sort of field names with still further underlying data and data format requirements.

In contrast with Application 103, FIG. 1A also shows application 105 is configured based on nominal type "B" 120, and that application 107 is configured based on nominal type "C" 130. Nominal types B and C, however, beyond being nominally incompatible, also comprise different type shapes 123 and 130 compared with type shape 113 for nominal type A. For example, FIG. 1A shows that type shape 123 of type name B 120 comprises elements 115 and 117, but differs from type shape 113 with respect to element 125. Similarly, FIG. 1A shows that nominal type C is configured with type shape 133, which differs with respect to element 135.

There are a number of situations in which such similarities and differences may be manifest at the same time in different applications or components. For example, applications 103, 105 and 107 may each comprise different database application programs using customer records, but may associate customer record fields differently. For example, element 125 in type shape 123 could represent a field for a unique identifier for the customer, while element 135 in type shape 133 could comprise a field for a digital signature.

Despite these various structural/shape differences between nominal types, implementations of the present invention allow applications 103, 105, and/or 107 to interoperate using one or more components in the nominal type framework 100. As will be understood more fully below, nominal type framework 100 can comprise one or more components or modules configured to identify what type names are being used from one application program to the next, as well as the corresponding type shapes prior to runtime. During runtime, the nominal type framework 100 allows the various applications to initiate one or more proxies that simply map structural elements from one nominal type to the next, making interoperation between applications possible despite using nominally incompatible types.

FIG. 1A shows that nominal type framework 100 comprises processing module 140, which can be configured to analyze and/or examine nominal types in applications. For example, FIG. 1A illustrates that processing module 140 receives an indication (i.e., message 150) from application 103 regarding the use of type shape 113 comprising elements 115 and 117. Similarly, one or more interfaces in application 103 could respond to one or more requests from processing module 140 for an identification of type names, structures, and/or corresponding functions. In additional or alternative implementations, application 103 simply publishes this information through one or more interfaces that can be accessed by processing module 140. In still additional or alternative implementations, processing module 140 performs an in-depth examination of application 103 (as well as 105, 107, etc.) at various times, or any time any component or update is installed in application 103 (or another application in the system).

One will appreciate that processing module 140 can perform these communications and/or examinations with/of the various applications during any point of installation, and even during runtime. For example, each time an application is installed, or has a component installed with the application, the nominal type framework 100 can initiate processing module 140 in order to communicate or parse the application in order to identify all types being used. In addition, processing module 140 can perform these examinations when application program 103 is initiated during runtime. However performed, each application program only ever interacts directly with the nominal type framework 100, and thus does not need to perform its own type evaluations and mappings.

In any event, the nominal type framework 100 can maintain the various type information any number of different ways. For example, FIG. 1A shows that processing module 140 prepares a set of results 160 which comprise a set of correlations in type shapes between nominal types in applications 103, 105, and 107. Upon generating results 160, the nominal framework 100 can be configured to pass the results 160 to one or more registries (not shown) in storage. In additional or alternative implementations, the nominal type framework 100 is also or alternatively configured to load the one or more registries as various data structures, such as in-memory data structures that are created anew each time a given application program initiates. In short, there are a wide range of mechanisms for both examining, correlating, storing, and retrieving the various correlations as needed.

In any event, FIG. 1A shows that processing module 140 identifies (e.g., results 160) the various type shapes that are common among the different nominally incompatible types A, B, and C of applications 103, 105, and 107. Specifically, FIG. 1A shows that processing module 140 has identified that each of nominal types A, B, and C include elements 115 and 117, such as requested in message 150. The nominal type framework 100 can then use these results 160 to generate run-time data structures that map the different nominal types, and thus facilitate at least some interoperation between application programs.

Figure 1B:
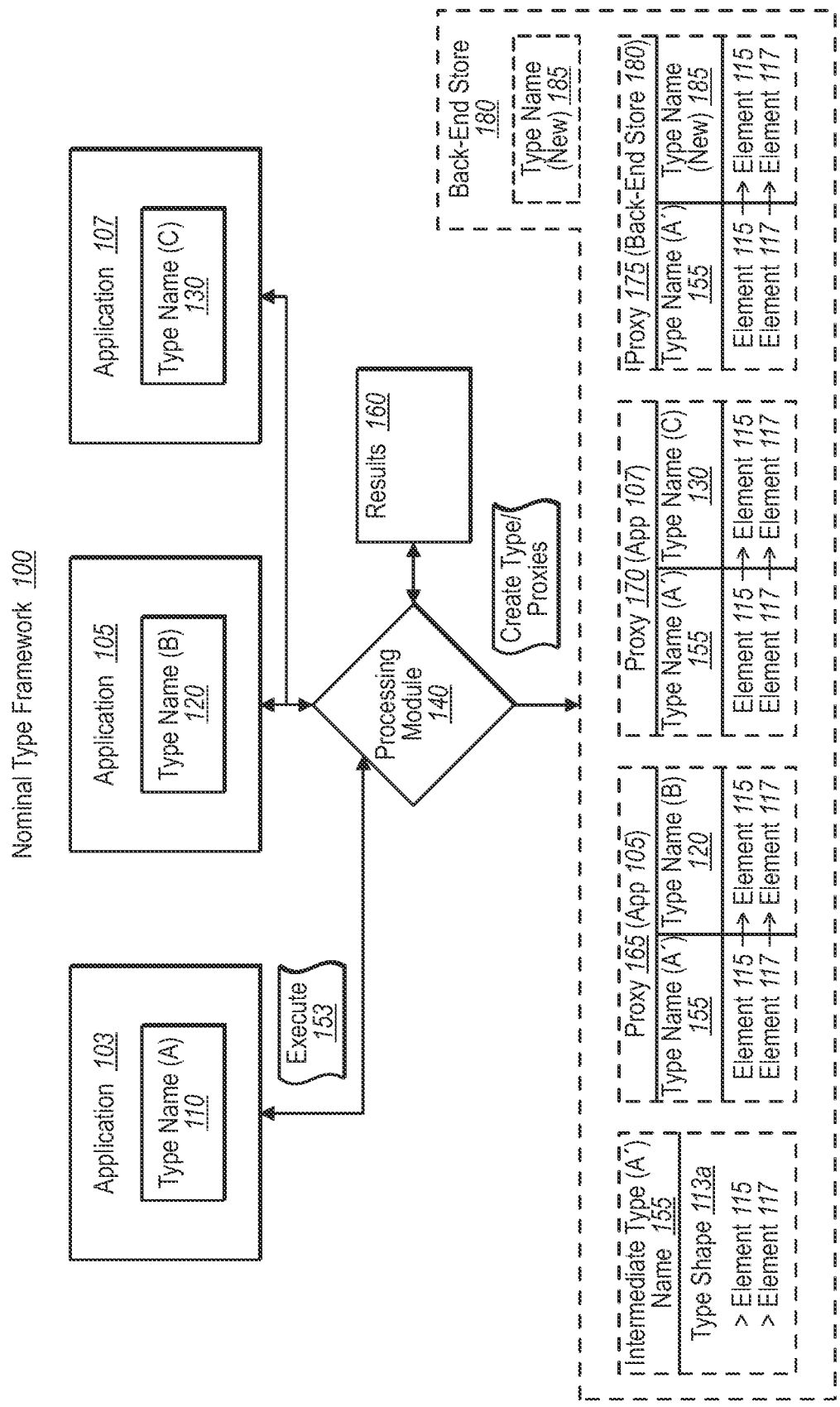
FIG. 1B illustrates an overview schematic diagram in accordance with an implementation of the present invention in which one or more data structures are created to map type shapes in nominally incompatible types.

For example, FIG. 1B illustrates a schematic diagram in which these various nominal type shapes 113, 123, and 133 are correlated at runtime by the nominal type framework 100. As understood more fully below, the nominal type framework 100 correlates these type shapes 113, 123, and 133 through one or more temporary, run-time data structures. For example, FIG. 1B shows that processing module 140 receives one or more requests 153 from application 103 to execute or otherwise initiate one or more functions involving nominal type A 110. At execution (run-time), processing module 140 then creates an intermediate data structure in the form of a temporary, new nominal type "A'" 155. In general, this intermediate, nominal type A' comprises a temporary type shape 113a, which can comprise an in-memory shape generated to include the previously identified common type shapes, or elements 115 and 117.

Processing module 140 then generates one or more runtime proxies that map the intermediate nominal type 155 to the nominal types in each of the other application programs 105, 107, etc. For example, FIG. 1B shows the processing module 140 generates proxy 165, which comprises one or more mapping tables that show the relationship in type shapes between nominal type 155 and nominal type 120 via a mapping of elements 115 and 117. Similarly, FIG. 1B shows that processing module 140 generates proxy 170, which comprises one or more mapping tables that show the relationship in type shapes between nominal type 155 and nominal type 130 via the mapping of elements 115 and 117.

In sum, there are a number of ways these various proxies 165, 170, etc., can be automatically generated. In most cases, for example, the code used to create proxies 165 and 170 is be included (e.g., as intermediate language code) within the nominal type framework 100, which can be compiled or otherwise called by a given application program 103, 105, etc. at runtime. In such cases, the developer of a given application need only include one or more references to the nominal type framework 100, requesting access of one or more of the available default proxies for mapping nominal types. In additional or alternative implementations, however, the applications 103, 105, 107, can also be configured with resident proxy code that the given application provides to the nominal type framework 100 at runtime.

However provided, the nominal type framework 100 ultimate executes the relevant proxy code, and configures the given proxies as appropriate for the requested execution. That is, each proxy is configured at runtime to comprise one or more interfaces not only for interacting with the nominal type framework 100 (e.g., via processing module 140), but also for interfacing directly with the given application, and implementing one or more execution/access requests made by another application. For example, application 103 may pass one or more different requests to access or otherwise handle functions or data maintained in application 105 as part of nominal type 120, or data in application 107 as part of nominal type 130. As long as application 103 is requesting access of data elements relating to elements 115 processing module 140 will simply map the requests through the various data structures using proxies 165, 170, which then process the changes to the relevant application data (e.g., in storage).

In the event types 110, 120, and 130 relate to customer records, for example, application 103 might request a change of a record managed by application 105 so that the first name (e.g., represented by element 115) in a particular record is changed from "John" to "Jack." Processing module 140 can then identify that this particular change request pertains to element 115 in intermediate type shape 113a, and process the data change request through proxy 165 (since application 105 was named). Similarly, application 103 might next request a change of a record managed by application 107 so that the last name (e.g., represented by element 117) in a particular record is changed from "Brown" to "Smith." Processing module 140 can then identify that this particular change request pertains to element 117 in intermediate type shape 113a, and process the data change request through proxy 170 (since application 107 was named). Thus, the nominal framework 100 does not deny the requests by application 103, even though the nominal types, and to some extent the nominal type shapes, are different from one application to the next.

In addition, FIG. 1B illustrates another potential implementation of the present invention with regard to a back-end store 180. Specifically, implementations of the present invention can be used to generate new records based on the intermediate nominal type A' for which it has not yet been decided where the new record should go. For example, and as opposed to simply altering a customer record in the above described examples, application 103 might create a new customer record that is ultimately placed in one or more both of the data stores for applications 105 and 107.

To use this particular feature, however, FIG. 1B shows that processing module 140 further creates a nominal type 185 for use in back-end store 180, and further creates one or more proxies 175. As with proxies 165 and 170, proxy 175 is used to map elements of type shape 113a in nominal type 155 to the elements of nominal type 185. Of course, since the new nominal type 185 has been created by the nominal type framework, the new nominal type 185 will likely comprise the same type shapes as those already created for the intermediate nominal type 155. Thus, for example, if application 103 requested a new record to be used in any one of applications 105, 107 (and potentially even in application 103), processing module 140 can handle such a request (and corresponding updates thereto) via proxy 175.

Accordingly, FIGS. 1A and 1B illustrate a number of different components and schematics that allow applications using different, nominally incompatible types to still interact with each other, and still access the underlying data managed by each application as necessary. As previously mentioned, such interoperability rests primarily on the notion that there are similarities in type shape/type structures between the different nominal types. As such, a developer need not necessarily be concerned with each of the different nominal types being used by other applications in a system, and can in most cases defer such handling of type incompatibilities to the system.

Figure 2:
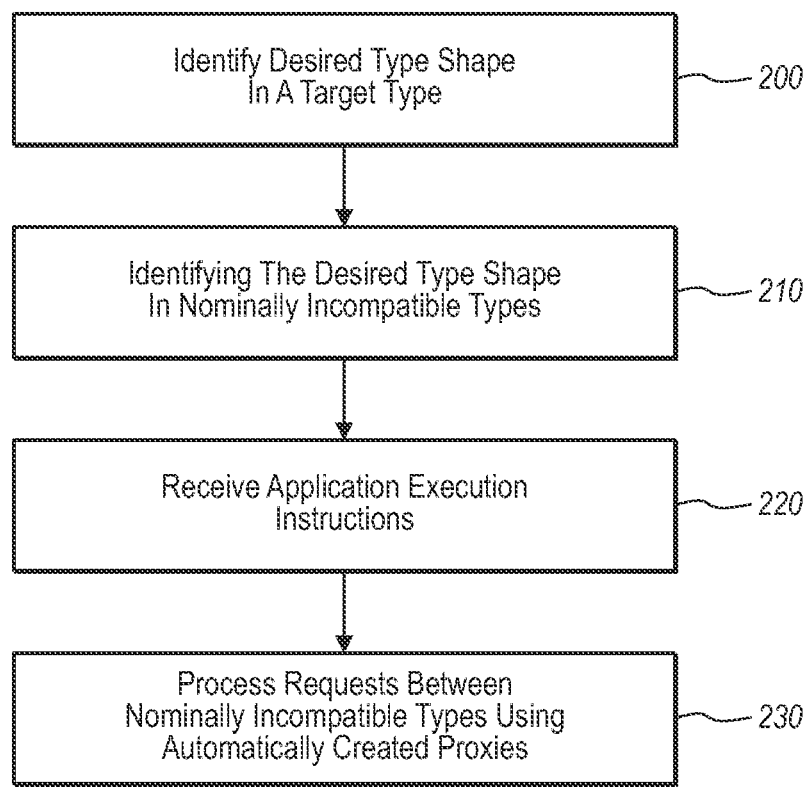
FIG. 2 illustrates a flow chart comprising a series of acts in a method for processing a request between nominally incompatible types in accordance with an implementation of the present invention.
Figure 3:
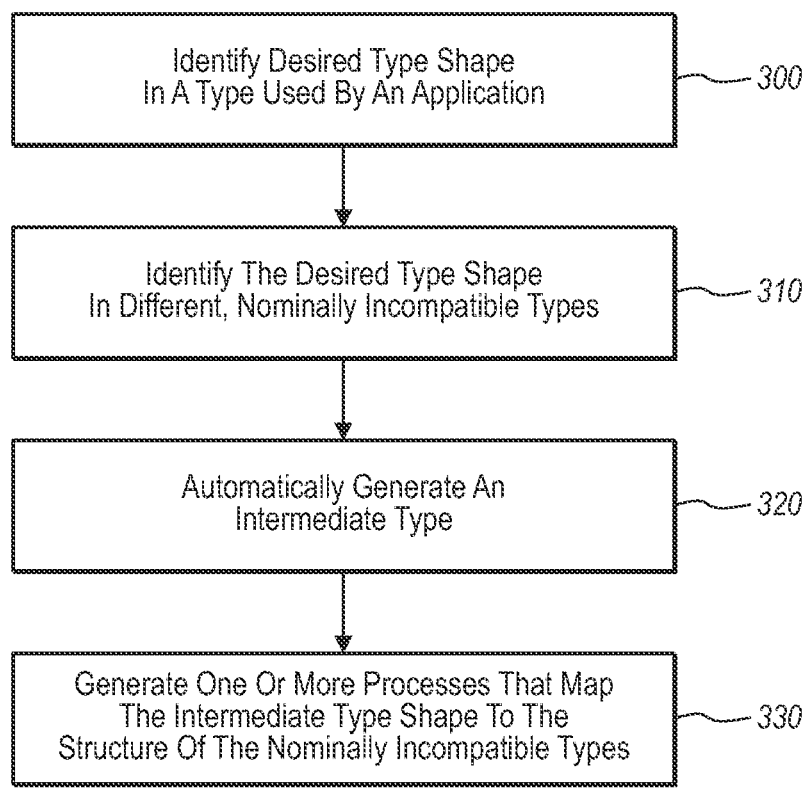
FIG. 3 illustrates a flow chart comprising one or more acts in the method for generating one or more data structures used to map nominally incompatible types in accordance with an implementation of the present invention.

In addition to the foregoing, implementations of the present invention can also be described in terms of flow charts comprising one or more acts in a method for accomplishing a particular result. For example, FIG. 2 illustrates a flow chart comprising a series of acts for processing one or more access requests by an application program using desired data structures in nominally incompatible types. In addition, FIG. 3 illustrates a flow chart of acts in a method for automatically generating one or more data structures that are used to correlate nominally incompatible types so that they can be used together. The acts of FIGS. 2 and 3 are described below in connection with the components and diagrams of FIGS. 1A and 1B.

For example, FIG. 2 illustrates that a method in accordance with the present invention can comprise an act 200 of identifying the desired type shapes in a target type. Act 200 includes identifying one or more desired type shapes of a target type used by an application program. For example, as shown in FIG. 1A, processing module 140 receives request (or communication) 150 regarding use of a type shape comprising elements 115 and 117. In such a case, elements 115 and 117 might comprise a required set of type elements that must be common in other nominal types in order for application 103 to be able to interoperate with other applications that may be using nominally incompatible types.

FIG. 2 also shows that the method in accordance with the present invention can comprise an act 210 of identifying the desired type shapes in nominally incompatible types. Act 210 includes identifying one or more different application programs having corresponding one or more nominally incompatible sources types that include the one or more desired type shapes of the target type. For example, as shown in FIG. 1A, processing module 140 interacts with applications 105 and 107 to identify different type shapes 123 and 133, which, in turn, have at least some type elements 115 and 117 that are similar or identical to the elements of type shape 113.

In addition, FIG. 2 shows that the method can comprise an act 220 of receiving application execution instructions. Act 220 includes receiving one or more instructions to execute the application program using the target type. For example, as shown in FIG. 1B, processing module 140 receives a request 153 to execute application 103, such as for example, when an application is initiated at run time.

Furthermore, FIG. 2 shows that a method in accordance with the present invention can comprise an act 230 of processing requests between nominally incompatible types using automatically created proxies. Act 230 includes after executing the application program, processing one or more access requests by the application program for the desired type shapes in the nominally incompatible types using one or more automatically generated proxies. For example, FIG. 1B shows that, at runtime, the processing module 140 has created proxy 165 and proxy 170, which correspondingly match the type shapes of intermediate nominal type 155 to nominal types 120 and 130.

In addition to the foregoing, FIG. 3 illustrates a flowchart of an additional or alternative method in accordance with an implementation of the present invention for generating one or more data structures that map nominally incompatible types. In particular, FIG. 3 shows that this additional or alternative method can comprise an act 300 of identifying desired type shapes in a type used by an application. Act 300 includes identifying one or more desired type shapes of a type used by an application program installed in the system. For example, FIG. 1A shows that processing module 140 identifies, e.g., via message 150 that application 103 can interoperate with other applications that use elements similar or identical to elements 115 and 117 of type shape 113 in nominal type 110.

FIG. 3 also shows that the method can comprise an act 310 of identifying the desired type shapes in different, nominally incompatible types. Act 310 includes identifying the one or more desired types structures in one or more nominally incompatible types used by one or more different application programs. For example, FIG. 1A shows that processing module 140 interacts with applications 105 and 107 to identify, e.g., via results 160, that nominal types B and C (120 and 130) also comprise type shapes with elements corresponding to elements 115 and 117 in nominal type A (110).

In addition, FIG. 3 shows that the method can comprise an act 320 of automatically generating an intermediate type. Act 320 includes automatically generating an intermediate type comprising a representation of the type used by the application program. For example, FIG. 1B shows that processing module creates an intermediate nominal type 155 comprising type shape 113a. Type shape 113a, in turn, can include a data structure comprising elements 115 and 117, such as previously indicated in message 150. In one implementation, type shape 113a comprises an in-memory data structure, though other data forms are also possible in accordance with the present invention.

Furthermore, FIG. 3 shows that the method in accordance with the present invention can comprise an act 330 of generating one or more proxies that map the intermediate type shape to the type shape of the incompatible nominal types. Act includes automatically generating one or more in-memory proxies that correlate the one or more desired type shapes/structures of the one or more nominally incompatible types to the generated intermediate type. For example, as shown in FIG. 1B, processing module 140 automatically generates proxies 165 and 170 at runtime (after receiving execution instructions 153). Proxies 165 and 170, in turn, to effectively map elements 115 and 117 between the intermediate nominal type 155 with the existing nominal types 120 and 130.

Accordingly, one will appreciate that the components, modules, and mechanisms illustrated and/or described with respect to FIGS. 1A through 3 can be used to project types within a nominal type system, as well as to project types from a structural to a nominal type system, all at runtime. In addition, implementations of the present invention allow developers to create a nominal type instance given an interface (with automatic creation of storage for the instance), and further to access and manipulate to original types via the projected interface. Again, such access and manipulation can occur via one or more type-specific proxies generated by the system at runtime, and do not otherwise require any laborious, application-specific efforts to correlate types with other applications. One will appreciate that the implementations described herein can be applied to a wide range of types and type structures including, for example, those associated with CLR and XML.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In an object-oriented computerized system implementing a nominal type framework and one or more nominally incompatible types used by one or more application programs therein, a method of automatically providing access by the application programs to data associated with the one or more nominally incompatible types, comprising the acts of:
    identifying one or more desired type shapes of a target type used by an application program;
    identifying one or more different application programs having one or more nominally incompatible source types, each of the one or more nominally incompatible source types comprising each of the one or more desired type shapes of the target type;
    receiving one or more instructions to execute the application program using the target type;
    generating an intermediate type, the intermediate type comprising an in-memory data structure, the intermediate type comprising the one or more desired type shapes, and the intermediate type being distinct from the type used by the application and the one or more nominally incompatible source types; and
    processing one or more access requests by the application program for data associated with the desired type shapes in the nominally incompatible types using one or more proxies, wherein the one or more proxies map at least one of the one or more desired type shapes in a first nominally incompatible type to the same type shape in a second nominally incompatible type through the intermediate type, wherein each of the one or more proxies comprises an in-memory data structure, and wherein the one or more proxies are automatically created at runtime.

2. The method as recited in claim 1, further comprising generating the intermediate type at runtime.

3. The method as recited in claim 1, wherein each proxy is associated with at least one of the one or more different application programs.

4. The method as recited in claim 1, wherein at least one of the one or more proxies is associated with a back-end data store of data structures not yet associated with an application program.

5. The method as recited in claim 1, wherein each of the one or more proxies maps each of the one or more desired type shapes in the identified source type to the same type shapes in the target type.

6. The method as recited in claim 1, wherein the act of processing the one or more access requests further comprises an acts of:
    receiving a request from a first application to access data corresponding to a nominally incompatible type; and
    identifying an automatically generated proxy for the request.

7. The method as recited in claim 6, wherein the data access request from the first application includes at least one of a read or write alteration to the data corresponding to the nominally incompatible type.

8. The method as recited in claim 6, further comprising an act of:
    passing the request to the automatically generated proxy, wherein the automatically generated proxy processes the request; and
    receiving one or more confirmations from the automatically generated proxy that the access request was processed.

9. The method as recited in claim 8, further comprising an act of passing a data structure modified through the request from a back-end data store to a data store managed by one of the one or more different application programs.

10. The method as recited in claim 1, wherein the identification of the one or more desired typed shapes of the target type occurs upon installation of the application program.

11. The method as recited in claim 10, further comprising the acts of:
    identifying installation of another application program that uses another type that is nominally incompatible with any other existing type in the system; and
    identifying one or more new type shapes that are common between the other nominally incompatible type and the existing types corresponding to the existing applications in the system.

12. The method as recited in claim 11, further comprising an act of:
    at runtime for the newly installed application program, generating one or more new proxies that map the one or more new type shapes to corresponding type shapes in one or more of the existing types in the system; and
    processing one or more access requests by the newly installed application program on data structures managed by the existing applications using the one or more new proxies.

13. In an object-oriented computerized system implementing a nominal type framework and one or more nominally incompatible types used by one or more application programs therein, a method of automatically providing access by the application programs to data associated with the one or more nominally incompatible types, comprising the acts of:
    identifying one or more desired type shapes of a type used by an application program installed in the system;
    identifying each of the one or more desired types shapes in one or more nominally incompatible types used by one or more different application programs;
    automatically generating an intermediate type, the intermediate type being distinct from the type used by the application and the one or more nominally incompatible types, the intermediate type comprising an in-memory data structure, comprising a representation of the type used by the application program, and comprising each of the one or more desired types shapes, the one or more desired types shapes being common type shapes of the type used by the application and the one or more nominally incompatible types; and
    automatically generating at runtime one or more proxies that map each of the one or more desired type shapes of the one or more nominally incompatible types to the same type shapes of the generated intermediate type and each of the one or more proxies comprising an in-memory data structure.

14. The method as recited in claim 13, further comprising an act of handling one or more access requests by the newly installed application for the identified one or more type shapes in the one or more source types through the created proxies.

15. The method as recited in claim 14, wherein the one or more access requests comprise a request to modify or write to one or more data structures corresponding to a nominally incompatible type managed by another application in the system.

16. The method as recited in claim 13, wherein at least one of the one or more proxies maps the one or more desired type shapes to a new type corresponding to a temporary data store.

17. The method as recited in claim 16, further comprising the acts of:
receiving a request to create a new data structure;
using the one or more proxies for the data store to process the request; and
passing control of the new data structure from the data store to one of the one or more different application programs.

18. In an object-oriented computerized system implementing a nominal type framework and one or more nominally incompatible types used by one or more application programs therein, a computer program product comprising one or more computer readable hardware storage devices having computer-executable instructions stored thereon that, when executed, cause one or more processors in the computerized system to perform a method comprising the acts of:
identifying one or more desired type shapes of a target type used by an application program;
identifying one or more different application programs having corresponding one or more nominally incompatible source types, each of the one or more nominally incompatible source types comprising each of the one or more desired type shapes of the target type;
receiving one or more instructions to execute the application program using the target type;
generating an intermediate type, the intermediate type comprising an in-memory data structure, the intermediate type comprising the one or more desired type shapes, and the intermediate type being distinct from the type used by the application and the one or more nominally incompatible source types; and
after executing the application program, processing one or more access requests by the application program for data associated with the desired type shapes in the nominally incompatible types using one or more proxies, wherein the one or more proxies map at least one of the one or more desired type shapes in a first nominally incompatible type to the same type shape in a second nominally incompatible type through the intermediate type, wherein each of the one or more proxies comprises an in-memory data structure, and wherein the one or more proxies are automatically created at runtime.

19. In an object-oriented computerized system implementing a nominal type framework and one or more nominally incompatible types used by one or more application programs therein, a method of automatically providing access by the application programs to data associated with the one or more nominally incompatible types, comprising the acts of:
identifying one or more desired type shapes of a target type used by an application program;
generating an intermediate type, the intermediate type comprising a data structure, the intermediate type comprising the one or more desired type shapes; and
processing one or more access requests by the application program for data associated with the desired type shapes in one or more nominally incompatible types using one or more proxies, each of the one or more nominally incompatible source types comprising each of the one or more desired type shapes of the target type, wherein the one or more proxies map at least one of the one or more desired type shapes in a first nominally incompatible type to the same type shape in a second nominally incompatible type through the intermediate type, wherein the intermediate type is distinct from the type used by the application and the one or more nominally incompatible source types, wherein each of the one or more proxies comprises an in-memory data structure, and wherein the one or more proxies are automatically created at runtime.

20. The method of claim 19, further comprising an act of automatically creating the one or more proxies for the identified one or more nominally incompatible source types at runtime.

21. The method as recited in claim 19, wherein the act of processing the one or more access requests further comprises an acts of:
receiving a request from a first application to access data corresponding to a nominally incompatible type; and
identifying an automatically generated proxy for the request.

22. The method as recited in claim 21, further comprising an act of:
passing the request to the automatically generated proxy, wherein the automatically generated proxy processes the request; and
receiving one or more confirmations from the automatically generated proxy that the access request was processed.

23. A system comprising one or more computer processors and system memory and which implements an object-oriented computerized system implementing a nominal type framework and one or more nominally incompatible types used by one or more application programs therein, the system implementing a method of automatically providing access by the application programs to data associated with the one or more nominally incompatible types, the method comprising the acts of:
identifying one or more desired type shapes of a target type used by an application program;
generating an intermediate type, the intermediate type comprising a data structure, the intermediate type comprising the one or more desired type shapes; and
processing one or more access requests by the application program for data associated with the desired type shapes in one or more nominally incompatible types using one or more proxies, each of the one or more nominally incompatible source types comprising each of the one or more desired type shapes of the target type, wherein the one or more proxies map at least one of the one or more desired type shapes in a first nominally incompatible type to the same type shape in a second nominally incompatible type through the intermediate type, wherein the intermediate type is distinct from the type used by the application and the one or more nominally incompatible source types, wherein each of the one or more proxies comprises an in-memory data structure, and wherein the one or more proxies are automatically created at runtime.

24. The system of claim 23, the method further comprising an act of automatically creating the one or more proxies for the identified one or more nominally incompatible source types at runtime.

25. The system of claim 23, wherein the act of processing the one or more access requests further comprises an acts of:
receiving a request from a first application to access data corresponding to a nominally incompatible type; and
identifying an automatically generated proxy for the request.

26. The system of claim 25, the method further comprising an act of:

passing the request to the automatically generated proxy, wherein the automatically generated proxy processes the request; and receiving one or more confirmations from the automatically generated proxy that the access request was processed.

* * * * *